(12) United States Patent
Lim et al.

(10) Patent No.: US 10,383,025 B2
(45) Date of Patent: Aug. 13, 2019

(54) METHOD FOR CONTROLLING HANDOVER IN WIRELESS COMMUNICATION SYSTEM, AND DEVICE THEREFOR

(71) Applicant: LG ELECTRONICS INC., Seoul (KR)

(72) Inventors: Jaewon Lim, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 449 days.

(21) Appl. No.: 14/410,821

(22) PCT Filed: Jul. 1, 2013

(86) PCT No.: PCT/KR2013/005801
§ 371 (c)(1),
(2) Date: Dec. 23, 2014

(87) PCT Pub. No.: WO2014/003500
PCT Pub. Date: Jan. 3, 2014

(65) Prior Publication Data
US 2015/0163719 A1    Jun. 11, 2015

Related U.S. Application Data

(60) Provisional application No. 61/665,913, filed on Jun. 29, 2012.

(51) Int. Cl.
*H04W 36/00* (2009.01)
*H04W 36/38* (2009.01)
(Continued)

(52) U.S. Cl.
CPC ....... *H04W 36/38* (2013.01); *H04W 36/0055* (2013.01); *H04W 36/08* (2013.01); *H04W 84/045* (2013.01); *H04W 92/20* (2013.01)

(58) Field of Classification Search
CPC ............ H04W 36/0083; H04W 12/06; H04W 36/0038; H04W 36/0058; H04W 36/0061;
(Continued)

(56) References Cited

U.S. PATENT DOCUMENTS

2011/0194530 A1    8/2011    Tinnakornsrisuphap et al.
2011/0263256 A1   10/2011    Yavuz et al.
(Continued)

FOREIGN PATENT DOCUMENTS

KR    10-2011-0046218 A    5/2011
KR    10-2012-0055671 A    5/2012
WO    WO 2011/069612 A1    6/2011

*Primary Examiner* — Charles N Appiah
*Assistant Examiner* — Xiang Zhang
(74) *Attorney, Agent, or Firm* — Birch, Stewart, Kolasch & Birch, LLP

(57) ABSTRACT

According to one embodiment of the present invention, disclosed is a method for a first pico base station for controlling handover between the first pico base station and a second pico base station in a wireless communication system. The method comprises the steps of: receiving, from user equipment, measurement results of a downlink reference signal of the second pico base station; and determining whether it is necessary to hand over to the second pico station based on the measurement results. If it is determined that it is necessary to handover to the second pico base station, the method may further comprise the steps of: sending an action switch request to the second pico base station; receiving setting data of the second pico base station for the action switch with the second pico base station; and changing the setting data of the first pico base station into the received setting data of the second pico base station.

6 Claims, 10 Drawing Sheets

(51) Int. Cl.
*H04W 36/08* (2009.01)
*H04W 84/04* (2009.01)
*H04W 92/20* (2009.01)

(58) Field of Classification Search
CPC ............. H04W 36/0085; H04W 36/30; H04M 2215/32
See application file for complete search history.

(56) References Cited

U.S. PATENT DOCUMENTS

| | | | |
|---|---|---|---|
| 2011/0300807 A1* | 12/2011 | Kwun ................... | H04W 24/10 455/63.1 |
| 2011/0306347 A1* | 12/2011 | Choi ..................... | H04W 36/04 455/438 |
| 2012/0327810 A1* | 12/2012 | Wang ................ | H04W 36/0083 370/254 |
| 2013/0171995 A1* | 7/2013 | Fujishiro ............... | H04W 28/08 455/441 |
| 2013/0281097 A1* | 10/2013 | Jung ................. | H04W 36/0072 455/444 |
| 2016/0037425 A1* | 2/2016 | Van Lieshout ....... | H04W 36/08 370/332 |
| 2018/0160337 A1* | 6/2018 | Gupta ..................... | H04W 8/26 |

\* cited by examiner

FIG. 7
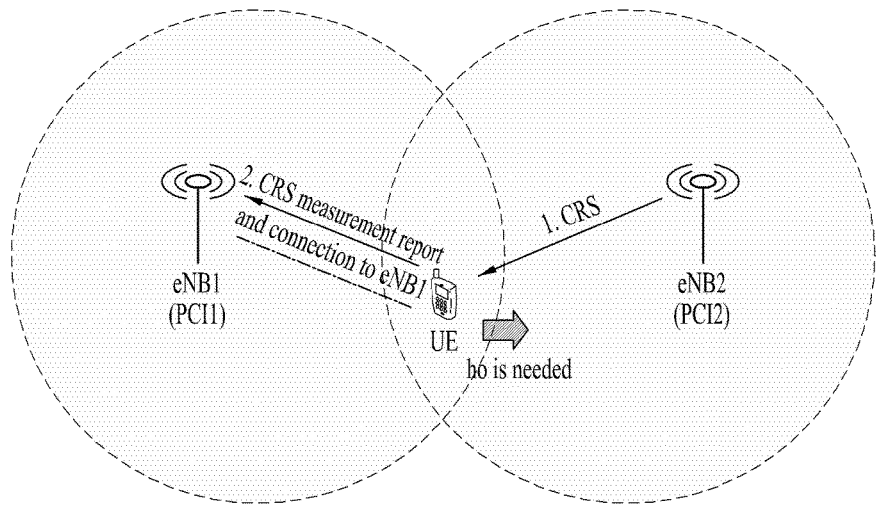
(a)
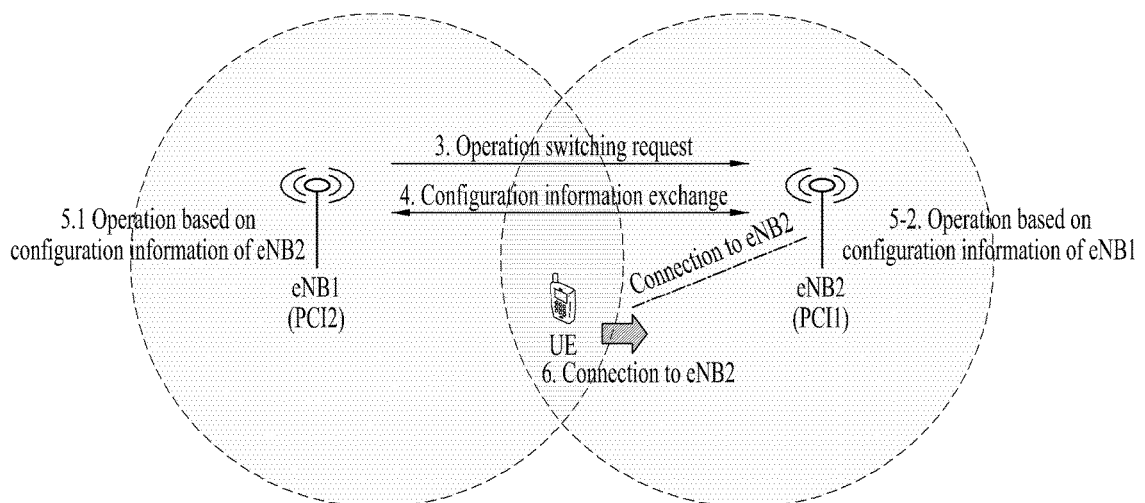
(b)

FIG. 8
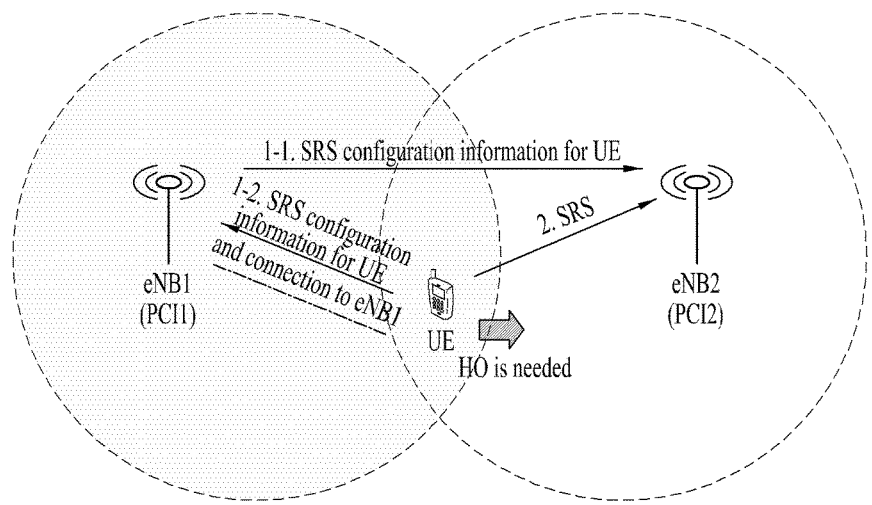
(a)
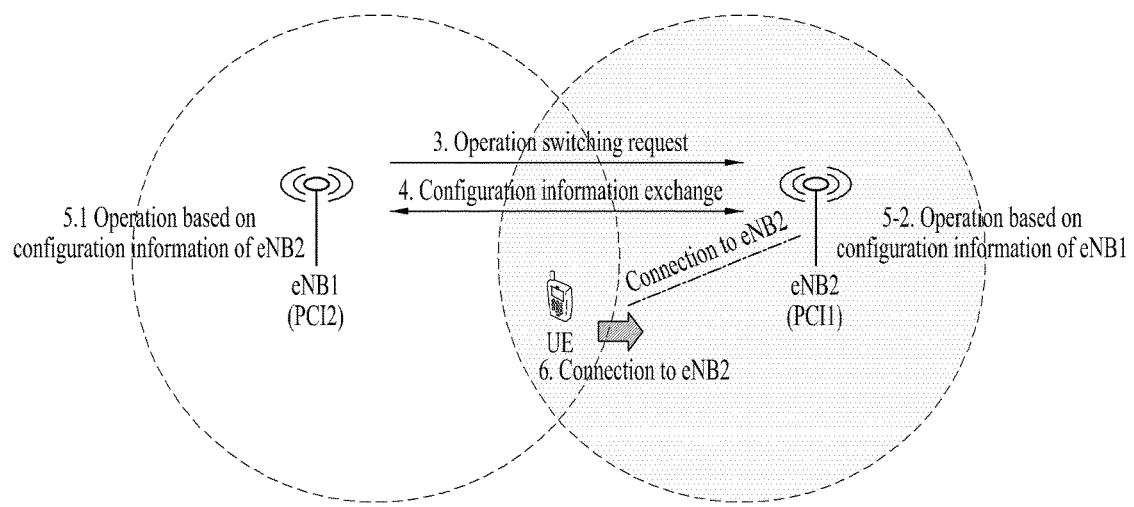
(b)

FIG. 9
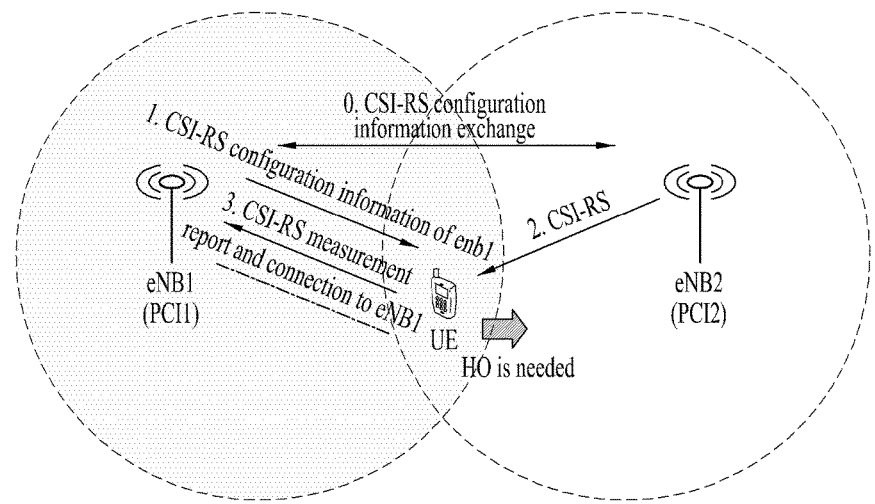
(a)
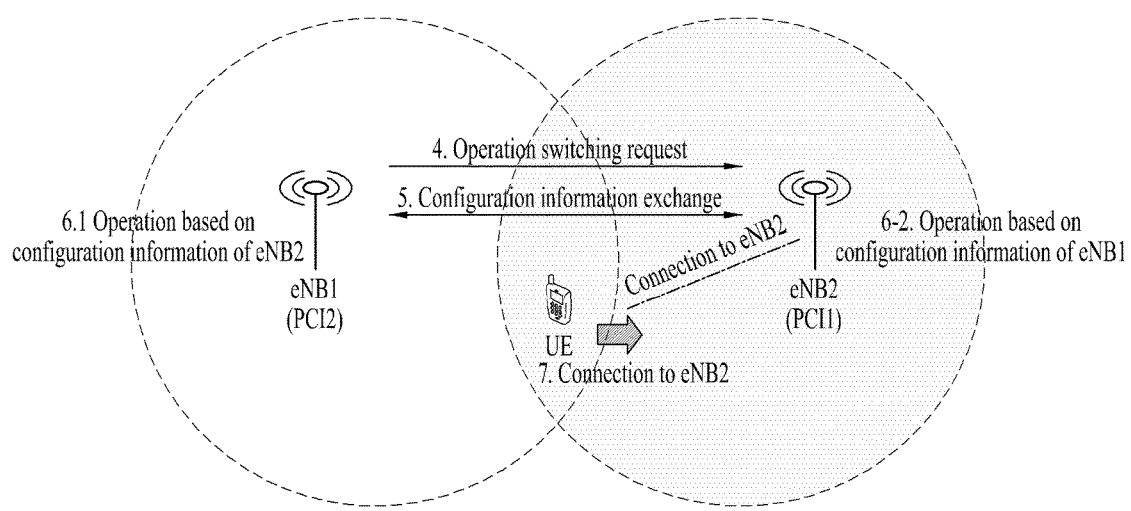
(b)

METHOD FOR CONTROLLING HANDOVER IN WIRELESS COMMUNICATION SYSTEM, AND DEVICE THEREFOR

CROSS REFERENCE TO RELATED APPLICATIONS

This application is the National Phase of PCT/KR2013/005801 filed on Jul. 1, 2013, which claims priority under 35 U.S.C. 119(e) to U.S. Provisional Application No. 61/665,913 filed on Jun. 29, 2012, all of which are hereby expressly incorporated by reference into the present application.

TECHNICAL FIELD

The present invention relates to a method and apparatus for controlling handover in a wireless communication system.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

In the multi-node system, frequent handover between multiple nodes causes overhead or a connection delay. Particularly, these problems become more serious in a wireless communication system in which small cells such as pico cells or femto cells are distributed. Accordingly, there is a need for a method for controlling handover in a small-cell environment.

DISCLOSURE

Technical Problem

An object of the present invention devised to solve the conventional problem is to provide a method for efficiently controlling handover of a User Equipment (UE) in a small-cell environment.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for controlling handover between a first pico Base Station (BS) and a second pico BS in a wireless communication system, performed by the first pico BS includes receiving from a User Equipment (UE) a measurement result of a downlink Reference Signal (RS) which the UE has received from the second pico BS and determining whether handover to the second pico BS is needed based on the measurement result. If handover to the second pico BS is needed, the method further includes transmitting an operation switching request to the second pico BS, receiving configuration information of the second pico BS, for operation switching with the second pico BS, and changing configuration information of the first pico BS to the received configuration information of the second pico BS.

Preferably, the method may further include maintaining an operation based on the configuration information of the first pico BS during an operation transition time configured for changing the configuration information of the first pico BS to the configuration information of the second pico BS.

Preferably, the method may further include requesting information about the downlink RS of the second pico BS to the second pico BS and receiving the information about the downlink RS of the second pico BS from the second pico BS in response to the requesting.

Preferably, the information about the downlink RS of the second pico BS may be a cell Identifier (ID) of the second pico BS.

Preferably, the information about the downlink RS of the second pico BS may be Channel State Information Reference Signal (CSI-RS) configuration information of the second pico BS.

Preferably, the method may further include, after the configuration information of the first pico BS is changed to the configuration information of the second pico BS, generating and transmitting a downlink RS using the configuration information of the second pico BS.

In another aspect of the present invention, a method for controlling handover between a first pico BS and a second pico BS in a wireless communication system, performed by the first pico BS includes receiving from a UE a measurement result of an uplink RS which the UE has transmitted to the second pico BS and determining whether handover to the second pico BS is needed based on the measurement result. If handover to the second pico BS is needed, the method further includes transmitting an operation switching request to the second pico BS, receiving configuration information of the second pico BS, for operation switching with the second pico BS, and changing configuration information of the first pico BS to the received configuration information of the second pico BS.

Preferably, the method further includes maintaining an operation based on the configuration information of the first pico BS during an operation transition time configured for changing the configuration information of the first pico BS to the configuration information of the second pico BS.

Preferably, the method may further include transmitting configuration information about the uplink RS of the UE to the second pico BS or the UE.

Preferably, the method may further include, after the configuration information of the first pico BS is changed to the configuration information of the second pico BS, receiving configuration information about an uplink RS of a specific UE from the second pico BS and receiving the uplink RS from the specific UE based on the configuration information about the uplink RS of the specific UE.

In another aspect of the present invention, a first pico BS for controlling handover between the first pico BS and a second pico BS in a wireless communication system includes a Radio Frequency (RF) unit, and a processor configured to control the RF unit. The processor is configured to receive from a UE a measurement result of a downlink RS which the UE has received from the second pico BS and to determine whether handover to the second pico BS is needed based on the measurement result. If handover to the second pico BS is needed, the processor is configured to transmit an operation switching request to the second pico BS, to receive configuration information of the second pico BS, for operation switching with the second pico BS, and to change configuration information of the first pico BS to the received configuration information of the second pico BS.

In another aspect of the present invention, a first pico BS for controlling handover between the first pico BS and a second pico BS in a wireless communication system includes an RF unit and a processor configured to control the RF unit. The processor is configured to receive from a UE a measurement result of an uplink RS which the UE has transmitted to the second pico BS and to determine whether handover to the second pico BS is needed based on the measurement result. If handover to the second pico BS is needed, the processor is configured to transmit an operation switching request to the second pico BS, to receive configuration information of the second pico BS, for operation switching with the second pico BS, and to change configuration information of the first pico BS to the received configuration information of the second pico BS.

The technical solutions are merely a part of the embodiments of the present invention and those skilled in the art will understand that various embodiments reflecting the technical features of the present invention can be derived from a detailed description of the present invention as given below.

Advantageous Effects

According to the embodiments of the present invention, handover can be controlled efficiently.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 7 illustrates an exemplary wireless communication environment according to an embodiment of the present invention;

FIG. 8 illustrates an exemplary wireless communication environment according to an embodiment of the present invention;

FIG. 9 illustrates an exemplary wireless communication environment according to an embodiment of the present invention;

BEST MODE FOR CARRYING OUT THE INVENTION

Figure 1:
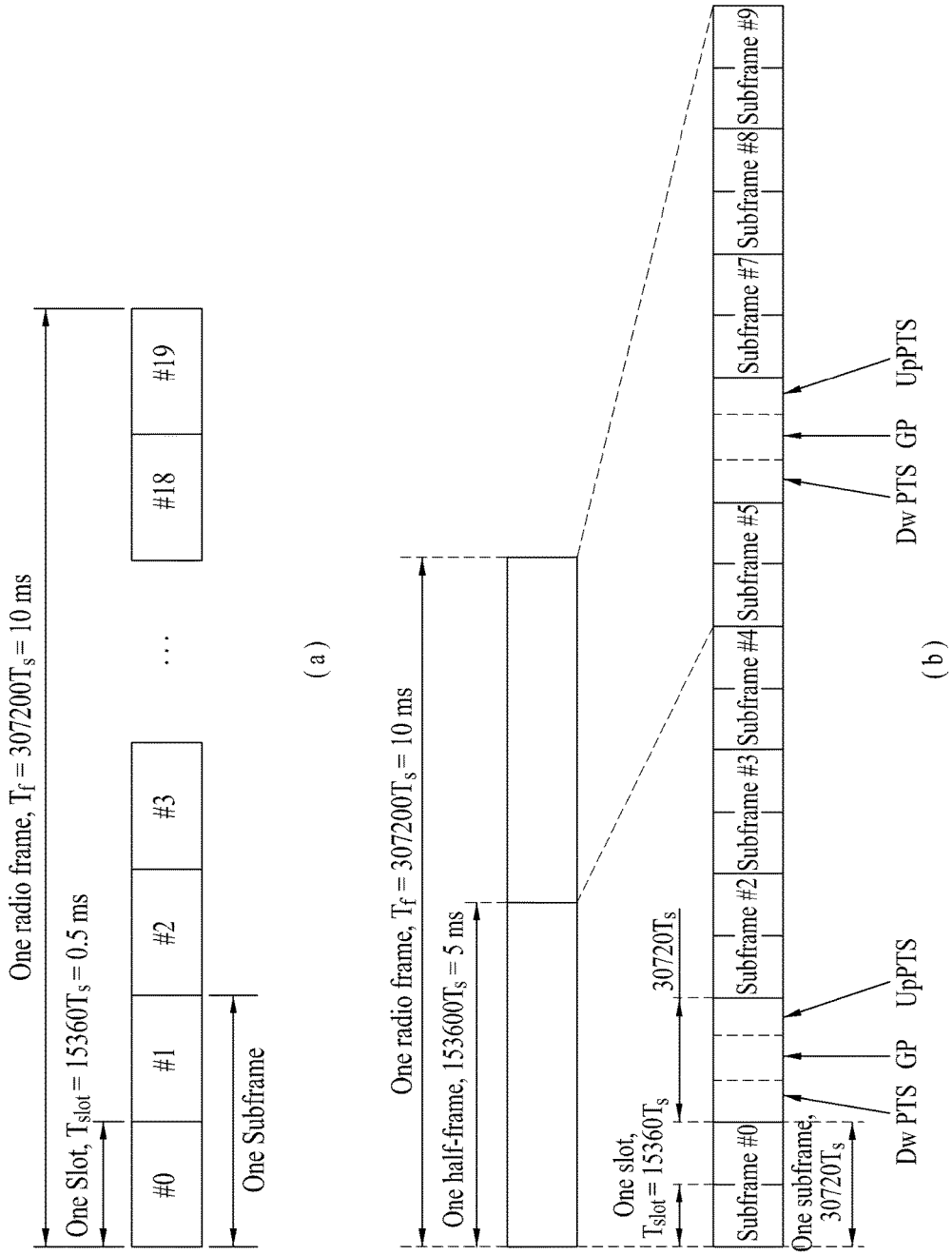
FIG. 1 illustrates an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

The following technique, apparatus and system is applicable to various wireless multiple access systems. For convenience of description, assume that the present invention is applied to 3GPP LTE(-A). However, the technical features of the present invention are not limited thereto. For example, although the following detailed description is made in detail on the assumption that a mobile communication system is a 3GPP LTE(-A) system, it is applicable to other prescribed mobile communication systems by excluding unique items of the 3GPP LTE(-A) system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

In addition, in the present invention, a CRS (Cell-specific Reference Signal)/DMRS (Demodulation Reference Signal)/CSI-RS (Channel State Information Reference Signal) time-frequency resources (or REs) refer to time-frequency resources (or REs) carrying CRS/DMRS/CSI-RS, REs allocated to CRS/DMRS/CSI-RS or available REs. A subcarrier including a CRS/DMRS/CSI-RS RE is referred to as a CRS/DMRS/CSI-RS subcarrier and an OFDM symbol including a CRS/DMRS/CSI-RS RE is referred to as a CRS/DMRS/CSI-RS symbol. In addition, in the present invention, SRS time-frequency resources (or REs) refer to time-frequency resources (or REs) transmitted from a UE to a BS to carry a sounding reference signal (SRS) used for measurement of an uplink channel state formed between the UE and the BS. A reference signal (RS) refers to a predefined signal known to a UE and a BS and having a special waveform and is referred to as a pilot signal.

Meanwhile, in the present invention, a cell refers to a predetermined geographical region in which a BS, node(s) or antenna port(s) provide a communication service. Accordingly, in the present invention, communication with a specific cell may refer to communication with a BS, node or antenna port for providing a communication service to the specific cell. In addition, a downlink/uplink signal of a specific cell refers to a downlink/uplink signal from/to a BS, node or antenna port for providing a communication service to the specific cell. In addition, channel state/quality of a specific cell refers to channel state/quality of a channel or communication link formed between a UE and a BS, node or antenna port for providing a communication service to the specific cell.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 2:
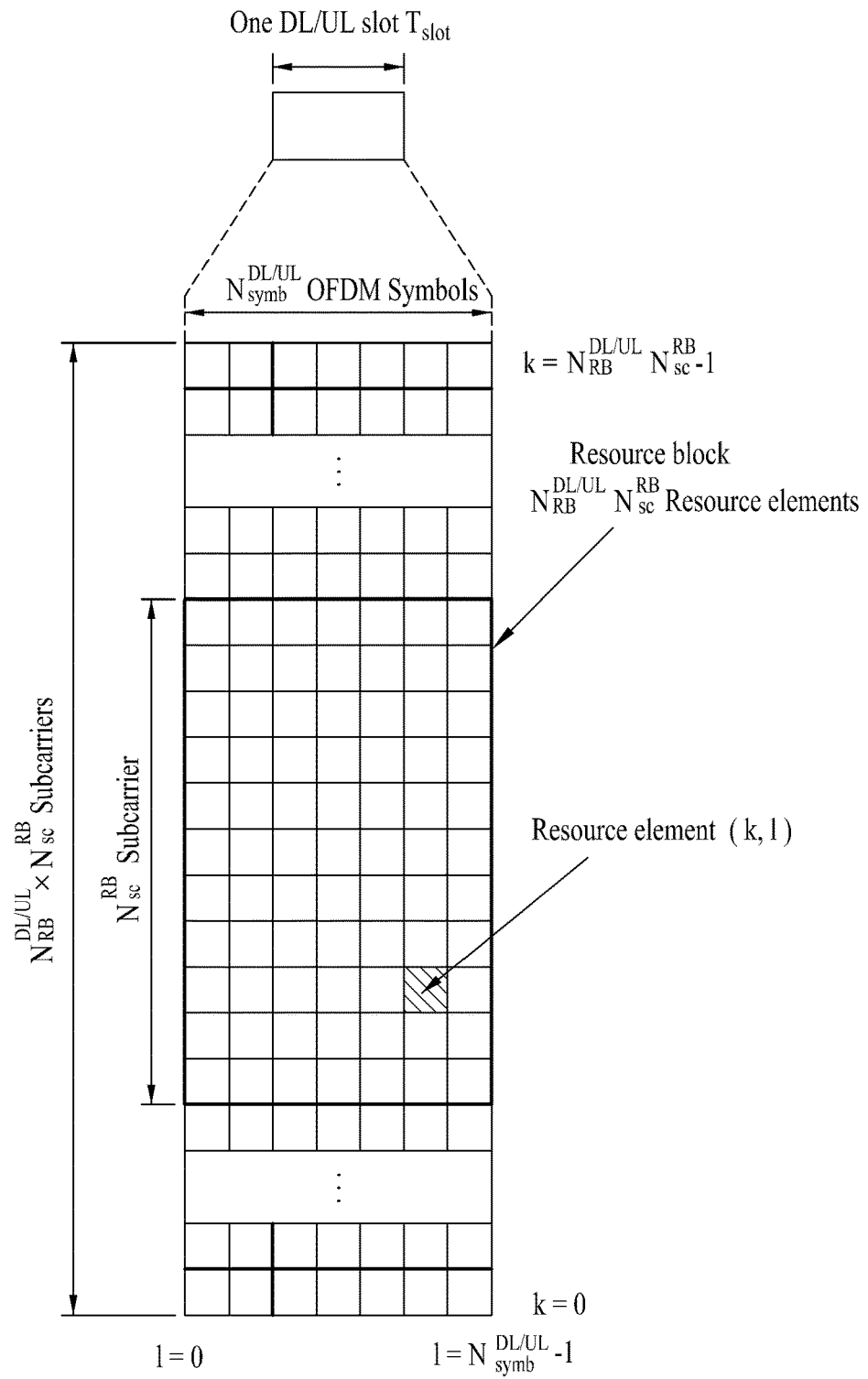
FIG. 2 illustrates an exemplary structure of a Downlink/Uplink (DL/UL) slot in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
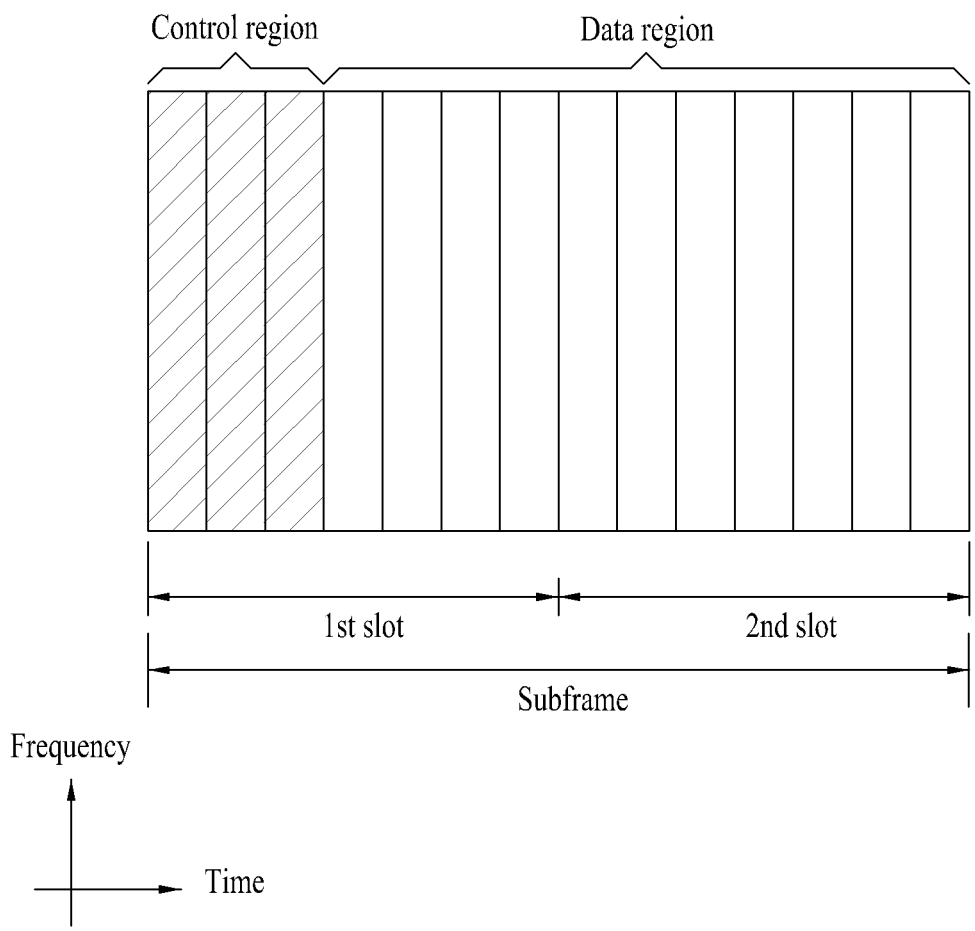
FIG. 3 illustrates an exemplary structure of a DL subframe in a $3^{rd}$ Generation Partnership project (3GPP) Long Term Evolution (LTE)/LTE-Advanced (LTE-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The size and purpose of DCI carried on a PDCCH depend on DCI format and the size thereof may be varied according to coding rate.

A plurality of PDCCHs may be transmitted in a PDCCH region of a DL subframe. A UE may monitor a plurality of PDCCHs. A BS decides a DCI format according to DCI to be transmitted to a UE and attaches a cyclic redundancy check (CRC) to the DCI. The CRC is masked with an identifier (e.g., a Radio Network Temporary Identifier (RNTI)) according to an owner or usage of the PDCCH. If the PDCCH is for a specific terminal, a cell-RNTI (C-RNTI) of the terminal may be masked to the CRC. Alternatively, if the PDCCH is for a paging message, a paging indicator identifier (P-RNTI) may be masked to the CRC. If the PDCCH is for system information (more specifically, a system information block (SIB)), a system information identifier and a system information RNTI (SI-RNTI) may be masked to the CRC. If the PDCCH is for a random access response, a random access-RNTI (RA-RNTI) may be masked to the CRC. CRC masking (or scrambling) includes an XOR operation of a CRC and an RNTI at a bit level, for example.

A PDCCH is transmitted on one control channel element (CCE) or an aggregate of a plurality of consecutive CCEs. The CCE is a logical allocation unit used to provide a coding rate to a PDCCH based on a radio channel state. The CCE corresponds to a plurality of resource element groups (REGs). For example, one CCE corresponds to nine REGs and one REG corresponds to four REs. Four QPSK symbols are mapped to each REG. An RE occupied by an RS is not included in an REG. Accordingly, the number of REGs within a given OFDM symbol is changed according to presence/absence of an RS. The REG concept is also used for other DL control channels (that is, a PCFICH and a PHICH). A DCI format and the number of DCI bits are determined according to the number of CCEs.

CCEs are numbered and consecutively used and, in order to simplify decoding, a PDCCH having a format composed of n CCEs may start from only a CCE having a number corresponding to a multiple of n. The number of CCEs used to transmit a specific PDCCH, that is, a CCE aggregation level, is determined by a BS according to a channel state. For example, in case of a PDCCH for a UE having a good DL channel (e.g., a UE adjacent to a BS), one CCE may be sufficient. However, in case of a PDCCH for a UE having a bad channel (e.g., a UE located at a cell edge), 8 CCEs are required to obtain sufficient robustness.

Figure 4:
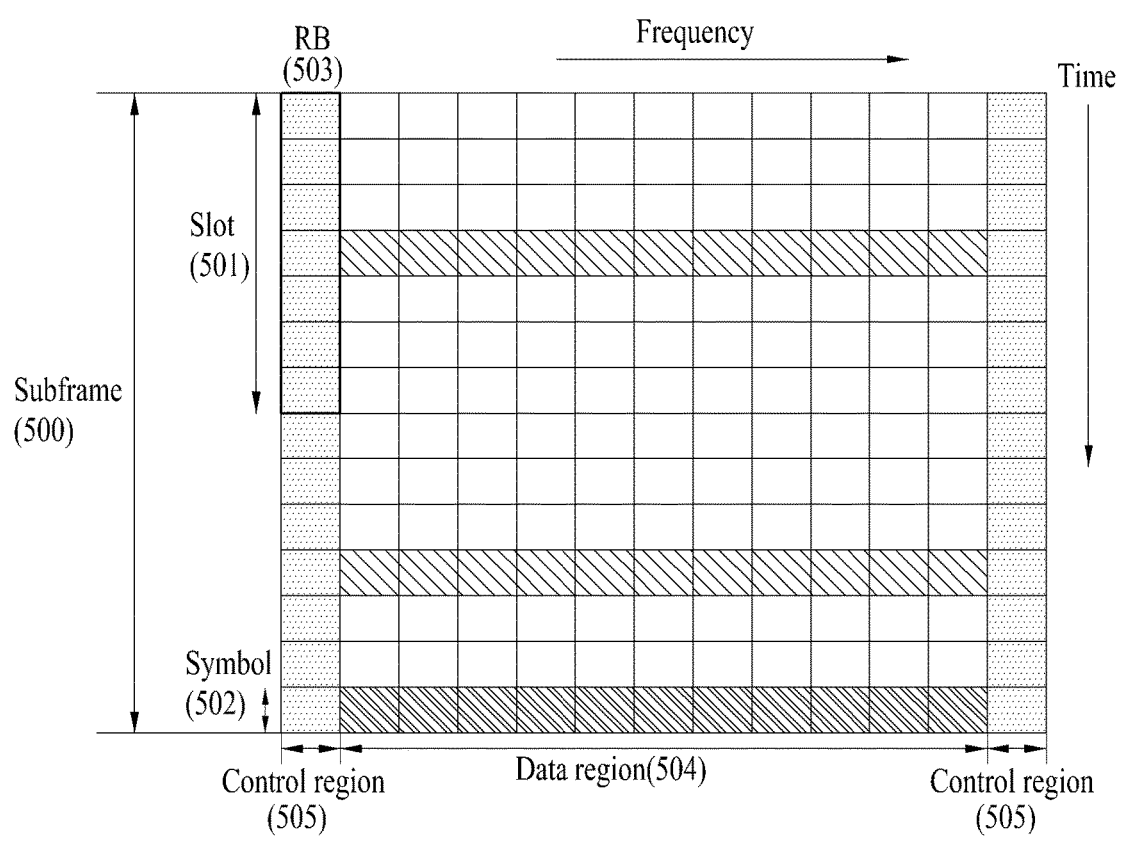
FIG. 4 illustrates an exemplary structure of a UL subframe in the 3GPP LTE/LTE-A system.

FIG. 4 illustrates an exemplary structure of a UL subframe in the LTE system.

Referring to FIG. 4, a 1-ms subframe 500, which is a basic LTE UL transmission unit, is divided into two 0.5-ms slots 501. In the case of normal Cyclic Prefix (CP), each slot includes 7 symbols 502, each symbol corresponding to one SC-FDMA symbol. A Resource Block (RB) 503 is a resource allocation unit defined by 12 subcarriers in the frequency domain by one slot in the time domain. The LTE UL subframe is divided largely into a data region 504 and a control region 505. The data region refers to communication resources used for a UE to transmit data such as voice, packets, etc., which are the remaining resources of the subframe except for the control region. The control region refers to communication resources used for a UE to transmit a DL channel quality report, an ACK/NACK for a DL signal, a UL scheduling request, etc.

As illustrated in FIG. 4, a Sounding Reference Signal (SRS) may be transmitted in the last SC-FDMA symbol of one subframe in the time domain and in a data transmission band in the frequency domain. SRSs transmitted in the last SC-FDMA symbol of the same subframe from a plurality of UEs may be distinguished from one another by their frequency positions.

An SRS is a Constant Amplitude Zero Auto Correlation (CAZAC) sequence. SRSs transmitted from a plurality of UEs are a CAZAC sequence $r^{SRS}(n)=r_{u,v}^{(\alpha)}(n)$ having different cyclic shift values $\alpha$ according to the following [Equation 1].

$$\alpha = 2\pi \frac{n_{SRS}^{cs}}{8} \qquad \text{[Equation 1]}$$

In [Equation 1], $n_{SRS}^{cs}$ is a value set for each UE by a higher layer, which is an integer between 0 and 7.

CAZAC sequences generated by cyclically shifting one CAZAC sequence have zero correlations with sequences having different cyclic shift values. SRSs transmitted in the same frequency area may be distinguished by their CAZAC sequence cyclic shift values based on this property. The SRS of each UE is allocated to a frequency according to a parameter set by an eNB. The UE frequency-hops the SRS to transmit the SRS in a total UL data transmission bandwidth.

Now, a detailed description will be given of a method for mapping an SRS to physical resources, for SRS transmission in the LTE system.

An SRS sequence $r^{SRS}(n)$ is multiplied by an amplitude scaling factor $\beta_{SRS}$ to satisfy transmission power $P_{SRS}$ and then mapped to Resource Elements (REs) with index (k,l), starting from $r^{SRS}(0)$ according to [Equation 2].

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \qquad \text{[Equation 2]}$$

In [Equation 2], $k_0$ represents the starting point of a frequency area of the SRS and $M_{sc,b}^{RS}$ is an SRS sequence length in subcarriers, that is a bandwidth in subcarriers, as defined by [Equation 3].

$$M_{sc,b}^{RS} = m_{SRS,b} N_{sc}^{RB}/2 \qquad \text{[Equation 3]}$$

In [Equation 3], $m_{SRS,b}$ is a value signaled according to a UL bandwidth $N_{RB}^{UL}$ by the eNB, as illustrated in [Table 2] to [Table 5] below.

To acquire, $m_{SRS,b}$ a cell-specific parameter $C_{SRS}$ being an integer ranging from 0 to 7 and a UE-specific parameter $B_{SRS}$ ranging from 0 to 3 are need. These parameters $C_{SRS}$ and $B_{SRS}$ are signaled by the higher layer.

TABLE 2

| $b_{hop}$ = 0, 1, 2, 3, values for the UL bandwidth of 6 ≤ $N_{RB}^{UL}$ ≤ 40. | | | | | | | | |
|---|---|---|---|---|---|---|---|---|
| SRS bandwidth configuration | SRS-Bandwidth $B_{SRS}$ = 0 | | SRS-Bandwidth $B_{SRS}$ = 1 | | SRS-Bandwidth $B_{SRS}$ = 2 | | SRS-Bandwidth $B_{SRS}$ = 3 | |
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 0 | 36 | 1 | 12 | 3 | 4 | 3 | 4 | 1 |
| 1 | 32 | 1 | 16 | 2 | 8 | 2 | 4 | 2 |

TABLE 2-continued $b_{hop}$ = 0, 1, 2, 3, values for the UL bandwidth of $6 \leq N_{RB}^{UL} \leq 40$.

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,b}$ | $N_b$ | $m_{SRS,b}$ | $N_b$ | $m_{SRS,b}$ | $N_b$ | $m_{SRS,b}$ | $N_b$ |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

TABLE 3

$b_{hop}$ = 0, 1, 2, 3, values for the UL bandwidth of $40 < N_{RB}^{UL} \leq 60$.

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

TABLE 4

$b_{hop}$ = 0, 1, 2, 3, values for the UL bandwidth of $60 < N_{RB}^{UL} \leq 80$.

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 5

$b_{hop}$ = 0, 1, 2, 3, values for the UL bandwidth of $80 < N_{RB}^{UL} \leq 110$.

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

In order to transmit the SRS in the total UL bandwidth, the UE may perform frequency hopping on the SRS. The frequency hopping is set according to a parameter $b_{hop}$ ranging from 0 to 3, signaled by the higher layer.

If SRS frequency hopping is disabled, that is, $b_{hop} \geq B_{SRS}$, a frequency position index $n_b$ has a predetermined value as expressed as [Equation 4]. Herein, $n_{RRC}$ is a parameter signaled by the higher layer.

$$n_b = \lfloor 4n_{RRC}/m_{SRS,b} \rfloor \bmod N_b \quad \text{[Equation 4]}$$

On the other hand, if SRS frequency hopping is enabled, that is, $b_{hop} < B_{SRS}$, the frequency position index $n_b$ is defined by [Equation 5] and [Equation 6].

$$n_b = \begin{cases} \lfloor 4n_{RRC}/m_{SRS,n} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Equation 5]}$$

$$F_b(n_{SRS}) = \begin{cases} (N_b/2)\left\lfloor \dfrac{n_{SRS} \bmod \prod_{b'=b_{hop}}^{b} N_{b'}}{\prod_{b'=b_{hop}}^{b} N_{b'}} \right\rfloor + \left\lfloor \dfrac{n_{SRS} \bmod \prod_{b'=b_{hop}}^{b} N_{b'}}{2\prod_{b'=b_{hop}}^{b} N_{b'}} \right\rfloor & \text{if } N_b \text{ even} \\ \lfloor N_b/2 \rfloor \left\lfloor n_{SRS}/\prod_{b'=b_{hop}}^{b} N_{b'} \right\rfloor & \text{if } N_b \text{ odd} \end{cases} \quad \text{[Equation 6]}$$

In [Equation 5] and [Equation 6], $n_{SRS}$ is a parameter by which the number of SRS transmissions is calculated, given by [Equation 7].

$$n_{SRS} = \begin{cases} 2N_{SP}n_f + 2(N_{SP}-1)\left\lfloor \dfrac{n_s}{10} \right\rfloor + \left\lfloor \dfrac{T_{offset}}{T_{offset\_max}} \right\rfloor, & \text{for 2ms } SRS \text{ periodicity of } TDD \text{ frame structure} \\ \lfloor (n_f \times 10 + \lfloor n_s/2 \rfloor)/T_{SRS} \rfloor, & \text{otherwise} \end{cases} \quad \text{[Equation 7]}$$

In [Equation 7], $T_{SRS}$ is an SRS periodicity and $T_{offset}$ is an SRS subframe offset. In addition, $n_s$ is a slot number and $n_f$ is a frame number.

To set the SRS periodicity $T_{SRS}$ and the SRS subframe offset $T_{offset}$, a UE-specific SRS configuration index $I_{SRS}$ is given for use in FDD and TDD, respectively in [Table 6] and [Table 7].

TABLE 6

UE-specific SRS periodicity $T_{SRS}$ and SRS subframe offset $T_{offset}$ in FDD.

| SRS Configuration Index $I_{SRS}$ | SRS Periodicity $T_{SRS}$ (ms) | SRS Subframe offset $T_{offset}$ |
|---|---|---|
| 0-1 | 2 | $I_{SRS}$ |
| 2-6 | 5 | $I_{SRS}$ - 2 |
| 7-16 | 10 | $I_{SRS}$ - 7 |
| 17-36 | 20 | $I_{SRS}$ - 17 |
| 37-76 | 40 | $I_{SRS}$ - 37 |
| 77-156 | 80 | $I_{SRS}$ - 77 |
| 157-316 | 160 | $I_{SRS}$ - 157 |
| 317-636 | 320 | $I_{SRS}$ - 317 |
| 637-1023 | reserved | reserved |

TABLE 7

UE-specific SRS periodicity $T_{SRS}$ and SRS subframe offset $T_{offset}$ in TDD.

| Configuration Index $I_{SRS}$ | SRS Periodicity $T_{SRS}$ (ms) | SRS Subframe offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ - 10 |
| 15-24 | 10 | $I_{SRS}$ - 15 |
| 25-44 | 20 | $I_{SRS}$ - 25 |
| 45-84 | 40 | $I_{SRS}$ - 45 |
| 85-164 | 80 | $I_{SRS}$ - 85 |
| 165-324 | 160 | $I_{SRS}$ - 165 |
| 325-644 | 320 | $I_{SRS}$ - 325 |
| 645-1023 | reserved | reserved |

The afore-described SRS-related information or parameters, for example, an SRS sequence, information about REs to which the SRS sequence is mapped, SRS bandwidth configuration information, an SRS configuration index, etc. may be referred to as SRS configuration information in the following embodiment(s) of the present invention.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
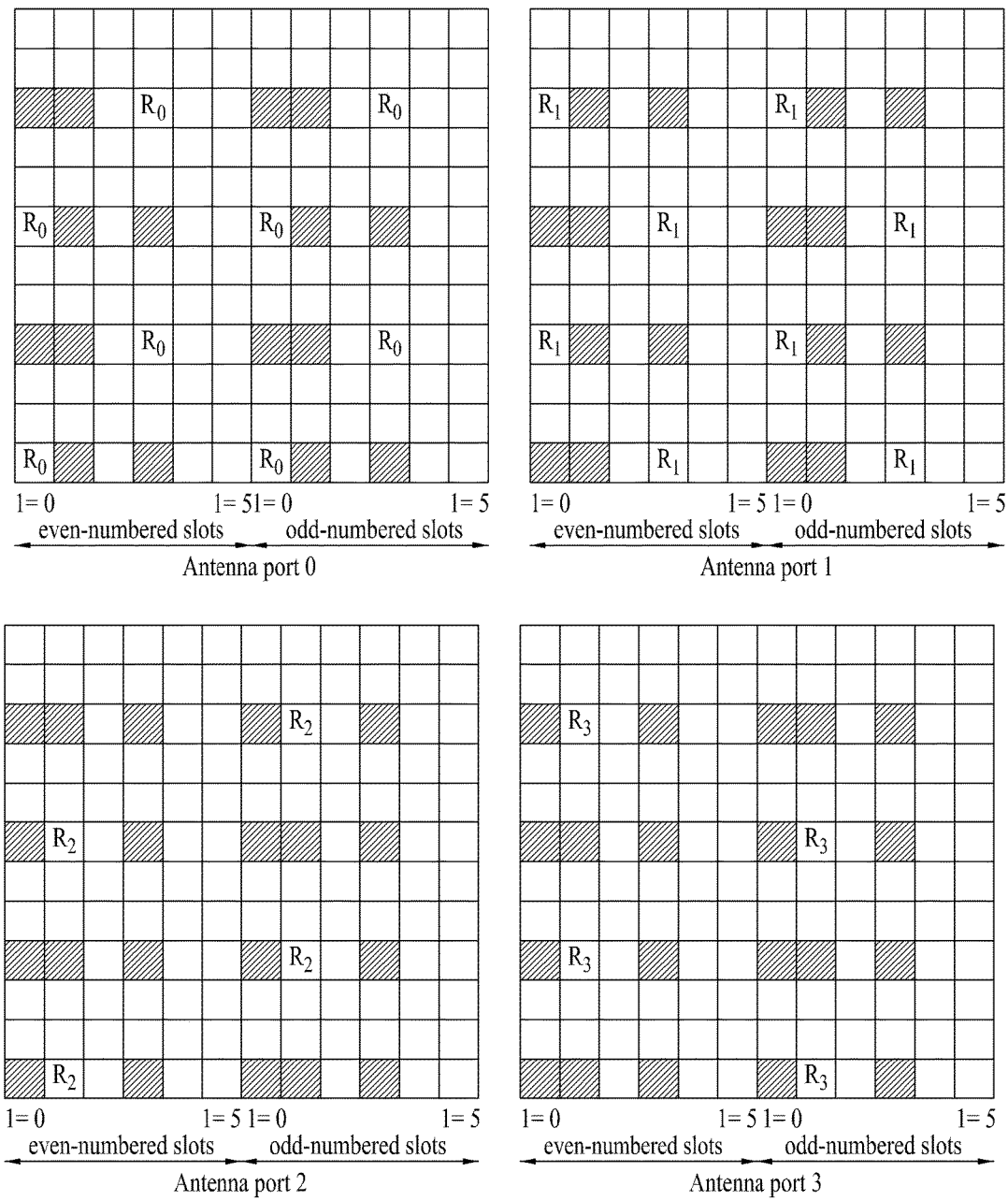
FIG. 5 illustrates Cell-Specific Reference Signal (CRS) patterns in the 3GPP LTE/LTE-A system.

FIG. 5 illustrates CRS patterns for different antenna ports. CRS is used for two purposes, that is, channel information acquisition and data demodulation. A UE-specific RS is used only for data demodulation. CRS is transmitted in every subframe in a broad band and RSs are transmitted for up to 4 antenna ports according to the number of transmission antennas in an eNB.

For example, if an eNB has two transmission antennas, CRSs for antenna port 0 and antenna port 1 are transmitted. If the eNB has four transmission antennas, CRSs for antenna port 0 to antenna port 3 are transmitted respectively.

Figure 6:
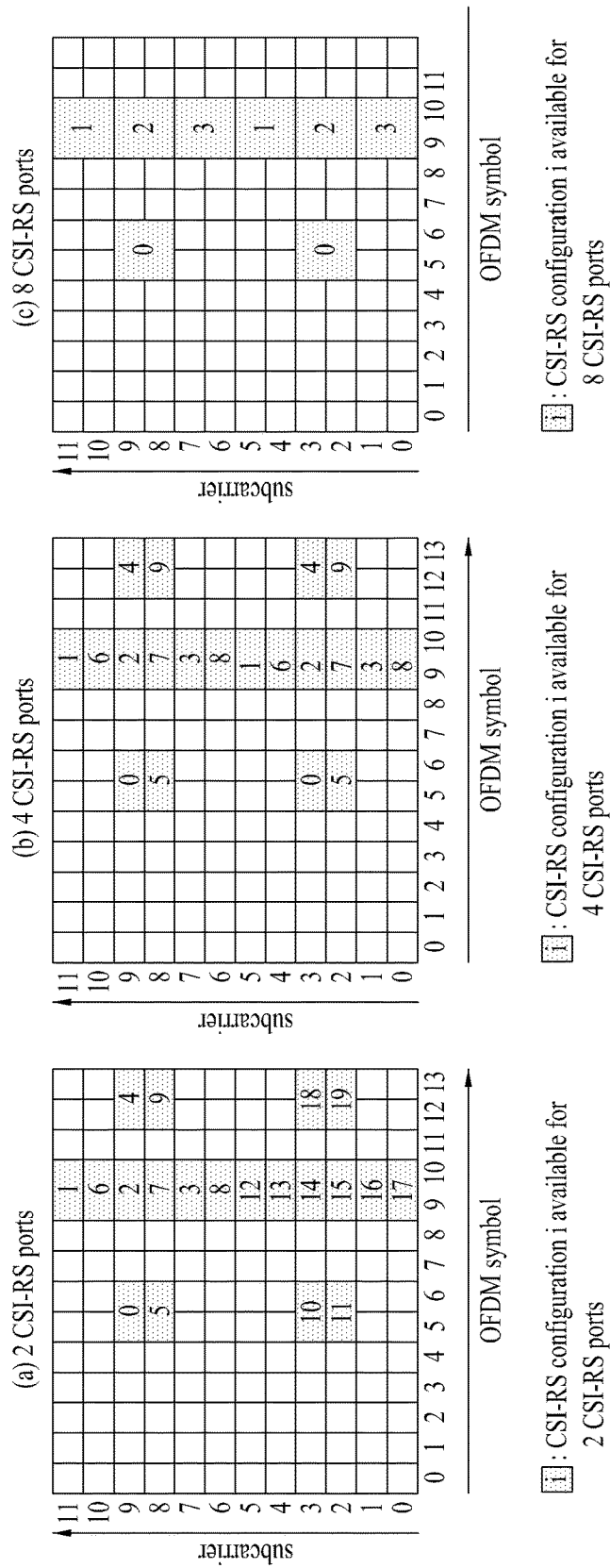
FIG. 6 illustrates Channel State Information Reference Signal (CSI-RS) patterns in the 3GPP LTE/LTE-A system.

FIG. 6 illustrates a CSI-RS mapping pattern. An antenna port through which a CSI-RS is transmitted is referred to as a CSI-RS port and positions of resources in a predetermined resource region in which corresponding CSI-RS(s) are transmitted through CSI-RS port(s) are referred to as a CSI-RS pattern or a CSI-RS configuration. In addition, a resource element (RE) used for CSI-RS transmission is referred to as a CSI-RS RE. While the position of an RE in which a CRS is transmitted per antenna port is fixed in the case of CRS, CSI-RS has a maximum of 32 different configurations in order to reduce inter-cell interference (ICI) in multi-cell environments including a hetero-network environment. CSI-RS configuration depends on the number of antenna ports in a cell and a CSI-RS is configured such that neighboring cells have different CSI-RS configurations. CSI-RS supports a maximum of 8 antenna ports (p=15, p=15, 16, p=15, ..., 18 and p=15, ..., 22), differently from CRS, and is defined for Δf=15 kHz only. Antenna ports p=15, . . . , 22 can respectively correspond to CSI-RS ports p=0, . . . , 7 in the following description.

FIG. 6 illustrates CSI-RS configurations. Particularly, FIG. 6 shows positions of resources occupied by CSI-RSs in an RB pair based on CSI-RS configurations.

FIG. 6($a$) illustrates 20 CSI-RS configurations available for 1 or 2 CSI-RS ports, FIG. 6($b$) illustrates 10 CSI-RS configurations available for 4 CSI-RS ports and FIG. 6($c$) illustrates 5 CSI-RS configurations available for 8 CSI-RS ports. Each CSI-RS configuration may be assigned a number based on the number of CSI-RS ports.

If the BS configures two antenna ports for transmitting CSI-RS, that is, if 2 CSI-RS ports are configured, the 2 CSI-RS ports perform transmitting CSI-RS on radio resources corresponding to one of 20 CSI-RS configurations depicted in FIG. 6($a$). When the number of CSI-RS ports configured for a specific cell is 4, the 4 CSI-RS ports transmit CSI-RSs on resources of a CSI-RS configuration for the specific cell from among the 10 CSI-RS configurations shown in FIG. 6($b$). When the number of CSI-RS ports configured for a specific cell is 8, the 8 CSI-RS ports transmit CSI-RSs on resources of a CSI-RS configuration for the specific cell from among the 4 CSI-RS configurations shown in FIG. 6($c$).

CSI-RS configurations have a nested property. The nested property is that a CSI-RS configuration for a larger number of CSI-RS ports is a super set of a CSI-RS configuration for a small number of CSI-RS ports. Referring to FIGS. 6($a$) and 6($b$), REs corresponding to a CSI-RS configuration for 4 CSI-RS ports are included in REs corresponding to a CSI-RS configuration for 8 CSI-RS ports, for example.

A plurality of CSI-RSs can be used in a predetermined cell. In the case of non-zero power CSI-RS, only a CSI-RS for one configuration is transmitted. In the case of zero power CSI-RS, CSI-RSs for a plurality of configurations can be transmitted. A UE assumes zero transmit power for resources other than resources assumed to be non-zero power CSI-RSs, from among resources corresponding to zero power CSI-RSs. For example, a CSI-RS is not transmitted in a special subframe in which downlink transmission and uplink transmission coexist, a subframe in which paging message is transmitted and a subframe in which transmission of a synchronization signal and a PBCH (physical broadcast channel) or SIB1 (system information block type 1) collides with transmission of a CSI-RS in a radio frame for TDD, and the UE assumes that a CSI-RS is not transmitted in these subframes. A time-frequency resource used by a CSI-RS port for CSI-RS transmission is not used for PDSCH transmission through any antenna port and is not used for CSI-RS transmission through an antenna port other than the CSI-RS port.

Since time-frequency resources used for CSI-RS transmission cannot be used for data transmission, throughput decreases as CSI-RS overhead increases. In view of this, CSI-RS is configured such that the CSI-RS is transmitted at a predetermined interval corresponding to a plurality of subframes instead of being configured such that the CSI-RS is transmitted in every subframe. In this case, CSI-RS transmission overhead can be remarkably reduced. In the following description, a subframe configured for CSI-RS transmission is referred to as a CSI-RS subframe. A CSI-RS subframe can be defined by CSI-RS transmission periodicity and subframe offset. The CSI-RS transmission periodicity and subframe offset are called a CSI-RS subframe configuration.

The BS can inform a UE of the following parameters through higher layer signaling (e.g. medium access control (MAC) signaling or radio resource control (RRC) signaling).

Number of CSI-RS ports
CSI-RS configuration
CSI-RS subframe configuration
CSI-RS subframe configuration period TCSI-RS
CSI-RS subframe offset $\Delta_{CSI-RS}$ The BS can inform the UE of a CSI-RS configuration transmitted with zero power and a subframe configuration for transmission of a zero power CSI-RS as necessary.

If a mobile communication terminal (i.e., a UE) moves from the coverage of a serving cell connected currently to the UE to the coverage of a neighbor cell and thus the received signal strength of the neighbor cell becomes larger than the received signal strength of the serving cell, the UE is connected to the neighbor cell by handover. Since the UE should perform a series of operations for the handover, the UE experiences a connection delay, which makes it impossible to conduct seamless communication. Moreover, frequent handover between cells having small coverage may bring about power consumption and communication outage for the UE.

To avert the problem, an embodiment(s) or the present invention provides a method for, when a UE needs to perform handover to a neighbor cell, switching transmission operations of a serving cell currently connected to the UE and a target cell (i.e. a neighbor cell) to which the UE will be connected by handover, so that the serving cell may operate based on configuration information of the target cell and the target cell may operate based on configuration information of the serving cell. From the viewpoint of the UE, even though the UE is connected to the target cell and operates in the target cell, the UE may be tricked into perceiving that the UE communicates with the serving cell by maintaining the connection with the serving cell because the target cell operates based on the pre-handover configuration information of the serving cell. The UE may transmit UE context information to the target cell during the handover. The UE context information may include information about a resource configuration allocated to the UE by the serving cell, UE capability information, and Radio Resource Management (RRM) information. As the target cell supports the same resource allocation and resource management as in the serving cell for the UE using the UE context information, the UE may operate in the same manner as when the UE is connected to the serving cell, despite the connection to the target cell.

The reason for switching operations between the serving cell and the target cell, instead of sharing one Physical Cell Identity (PCI) between them is that if a plurality of cells perform the same transmission operation, the frequency use efficiency is lower than when the cells operate independently. The target cell performs a general cell operation of transmitting a control signal and data in every Transmission Time Interval (TTI) (e.g., subframe), and an operation of communicating with the UE which has moved to the coverage of the target cell, only when needed.

Configuration information for a transmission operation of a cell required for operation switching between cells may include a PCI, CRS transmission positions, CRS transmission power, a SubFrame Number (SFN), etc. A PCI may be referred to as a Physical Cell Identifier (PCID) in the present disclosure.

It is assumed that a cell considered in the present disclosure is a small cell having a coverage radius ranging from several meters to tens of meters. Since channel characteristics are almost similar between adjacent cells in a small-cell environment, even though a cell to or from which a UE transmits signals or receives signals is changed by the method for switching operations between adjacent cells and communicating with a UE in the switched operations according to the embodiment(s) of the present invention, the UE is not affected in an environment considered in the present invention.

Embodiment 1

The present invention provides three methods for switching of operations between cells according to RS types (CRS, SRS, and CSI-RS) that a UE or a cell (or eNB) refers to.

FIG. 7 illustrates an exemplary wireless communication environment according to an embodiment of the present invention. CRS is used in the embodiment related to FIG. 7. A UE is located in an overlapped area between the coverage of eNB1 (i.e., a serving cell) and the coverage of eNB2 (i.e., a target cell). Both the serving cell and the target cell may transmit CRSs to the UE. For example, since the UE is yet to perform handover to the target cell, the target cell may transmit a CRS scrambled with a scrambling Identifier (ID) (e.g., PCI1) of the serving cell.

The serving cell may receive a measurement value of a CRS transmitted by the serving cell and a measurement value of a CRS transmitted by the target cell from the UE. The serving cell may determine whether handover to the target cell is needed by comparing the two measurement values. If the serving cell determines that the handover to the target cell is needed, the serving cell may request operation switching to the target cell. Selectively, the target cell may transmit a response to the request to the serving cell. The response may simply indicate reception of the request, or the response may further indicate rejection of the request. Then, the serving cell and the target cell may exchange configuration information for transmission operations with each other. The afore-described information about PCIs, CRS transmission positions, CRS transmission power, and SFNs may be exchanged.

The serving cell and the target cell may operate using the exchanged configuration information. Specifically, the serving cell may operate based on pre-handover configuration information of the target cell and the target cell may operate based on pre-handover configuration information of the serving cell. Therefore, the UE may complete the handover to the target cell without a legacy handover operation. A PCI is given as a major example of the configuration information. While PCI1 and PCI2 are configured for the serving cell and the target cell respectively in FIG. 7(a), it is noted from FIG. 7(b) that PCI1 and PCI2 are exchanged with each other.

FIG. 8 illustrates an exemplary wireless communication environment according to an embodiment of the present invention. In the embodiment related to FIG. 8, SRS is used. A UE is located in an overlapped area (hereinafter, referred to as a cell edge) between the coverage of eNB1 (i.e., a serving cell) and the coverage of eNB2 (i.e., a target cell).

The embodiment related to FIG. 8 is different from the embodiment related to FIG. 7 in that the target cell does not need to be operating for communication, that is, to be awake due to the use of SRS. Particularly, the embodiment(s) of the present invention is based on the premise of a small-cell environment and a small cell may serve a very small number of UEs or no UE. In this case, the small cell (e.g., the target cell) may be preferably powered off to reduce power consumption. The embodiment related to FIG. 8 may be implemented in this situation, by way of example.

The serving cell may transmit SRS configuration information of the UE to the target cell via an inter-cell interface. The serving cell may also transmit the SRS configuration information to the UE on a DL.

The target cell may receive an SRS from the UE without transmitting a signal to the UE until before the UE moves out of the cell edge and enters the coverage of the target cell. That is, the target cell may minimize power consumption by operating only in a TTI, that is, a subframe in which the UE will transmit an SRS, based on the SRS configuration information received from the serving cell. In FIGS. 8(a) and 8(b), a cell having hashed coverage operates normally, while a cell having blank coverage may receive the SRS in a specific subframe and wait powered-off in the other subframes.

While not shown in FIG. 8, the UE may transmit an SRS to the serving cell, so that measurement values of SRSs received from the UE in the serving cell and the target cell may be compared.

The serving cell may receive a measurement value of the SRS received from the UE in the serving cell and a measurement value of the SRS received from the UE in the target cell. If the serving cell determines that the UE needs to perform handover to the target cell by comparing the measurement values. If the serving cell determines that the UE needs to perform handover to the target cell, the serving cell may request operation switching between the serving cell and the target cell to the target cell. Selectively, the target cell may transmit a response to the request to the serving cell. The response may simply indicate reception of the request, or the response may further indicate rejection of the request. Then, the serving cell and the target cell may exchange configuration information for transmission operations with each other. The afore-described information about PCIs, CRS transmission positions, CRS transmission power, and SFNs may be exchanged.

The serving cell and the target cell may operate using the exchanged configuration information. Specifically, the serving cell may operate based on pre-handover configuration information of the target cell and the target cell may operate based on pre-handover configuration information of the serving cell. Therefore, the UE may complete the handover to the target cell without a legacy handover operation.

As the operations are switched between the serving cell and the target cell, the serving cell may operate in the same manner as the target cell does before the handover. For example, upon receipt of SRS configuration information of a specific UE from another neighbor cell, the serving cell may receive only an SRS from the specific UE in a specific subframe based on the SRS configuration information and may be powered off in the other subframes.

A PCI is given as a major example of the configuration information. It is noted that while PCI1 and PCI2 are configured for the serving cell and the target cell respectively in FIG. 8(a), PCI1 and PCI2 are exchanged with each other in FIG. 8(b).

FIG. 9 illustrates an exemplary wireless communication environment according to an embodiment of the present invention. In the embodiment related to FIG. 9, CSI-RS is used. A UE is located in an overlapped area (hereinafter, referred to as a cell edge) between the coverage of eNB1 (i.e., a serving cell) and the coverage of eNB2 (i.e., a target cell).

The serving cell may request exchange of CSI-RS configuration information of the serving cell and the target cell to the target cell. The CSI-RS configuration information may include, for example, information about the number of CSI-RS ports, a CSI-RS configuration, a CSI-RS subframe configuration, a CSI-RS subframe configuration periodicity $T_{CSI-RS}$, and a CSI-RS subframe offset $\Delta CSI\text{-}RS$, as described before. The exchange of the CSI-RS configuration information is not mandatory and the serving cell may simply request the CSI-RS configuration of the target cell to the target cell. Then the serving cell may transmit the CSI-RS configuration information of the target cell to the UE. The UE may receive CSI-RSs from the target cell based on the CSI-RS configuration information of the target cell, measure the CSI-RSs received from the target cell (hereinafter, referred to as "CSI-RSs of the target cell"), and transmit the measurement result to the serving cell.

While not shown, the UE may measure CSI-RSs received from the serving cell (hereinafter, referred to as "CSI-RSs of the serving cell"), and transmit the measurement result to the serving cell. For example, the CSI-RS measurement result may be the magnitude of a signal carrying the CSI-RSs received from the cell.

The serving cell may determine whether the UE needs to perform handover to the target cell based on the CSI measurement result of the target cell received from the UE. If the serving cell determines that the UE needs to perform handover to the target cell, the serving cell may request operation switching between the serving cell and the target cell to the target cell.

Selectively, the target cell may transmit a response to the request to the serving cell. The response may simply indicate reception of the request, or the response may further indicate rejection of the request. Then, the serving cell and the target cell may exchange configuration information for transmission operations with each other. The afore-described information about PCIs, CRS transmission positions, CRS transmission power, and SFNs may be exchanged.

The serving cell and the target cell may operate using the exchanged configuration information. Specifically, the serving cell may operate based on pre-handover configuration information of the target cell and the target cell may operate based on pre-handover configuration information of the serving cell. Therefore, the UE may complete the handover to the target cell without a legacy handover operation. A PCI is given as a major example of the configuration information. It is noted that while PCI1 and PCI2 are configured for the serving cell and the target cell respectively in FIG. 9(*a*), PCI1 and PCI2 are exchanged with each other in FIG. 9(*b*).

Similarly to the embodiment related to FIG. 8, the cell that does not serve a UE may operate only in a subframe in which a CSI-RS measurement result will be received from the UE in the embodiment related to FIG. 9. That is, the target cell before handover of the UE may operate only when a CSI-RS measurement result of the serving cell is received from the UE and may wait powered-off during the remaining time period.

In FIGS. 9(*a*) and 9(*b*), a cell having hashed coverage operates normally, while a cell having blank coverage may receive only an SRS in a specific subframe and wait powered-off in the other subframes.

After the UE performs handover to the target cell, the serving cell periodically transmits CSI-RSs according to its CSI-RS configuration information. A sequence for the CSI-RSs may be generated using the original ID of the target cell, PCI2. The target cell may transmit the CSI-RS configuration information of the serving cell to the UE so that the UE may receive CSI-RSs from the serving cell at a corresponding time point and measure the CSI-RSs.

As in the afore-described embodiments, when the method for determining whether to perform operation switching using an RS of a target cell is implemented, there may be an idle-state UE operating in the coverage of the target cell, to which the target cell is a serving cell. While the idle-state UE does not communicate by connecting to its serving cell (i.e., the target cell), the UE sets a cell from which it will receive a paging signal in the idle state. However, since the UE is not connected to the target cell in the idle state, the target cell may not be aware of the presence of the idle-state UE. If the target cell performs operation switching, the target cell may not serve the idle-state UE any longer. Therefore, a specific list (e.g., a white list) may be generated and managed so that the UE may not set a cell such as the target cell as its serving cell in the idle state. For example, the specific list may include cells such as the target cell so that an idle-state UE(s) may not set the cells included in the specific list as its serving cell.

Embodiment 2

While a UE is capable of conducting normal communication with a target cell, a serving cell and the target cell may exchange configuration information for their operations and operate based on the exchanged configuration information. When the target cell switches to the operation of the serving cell using the configuration information of the serving cell, an operation transition time may be needed. Therefore, the serving cell maintains its original operation without operating based on the configuration information for the operation of the target cell during the operation transition time of the target cell. While the target cell is switching to the operation of the serving cell, the UE maintains the connection to the serving cell, thus conducting seamless communication.

As the PCIs of the cells are changed during the operation transition time, signals subject to changing may be generated. These signals may include a CRS, a PDCCH, a Synchronization Signal (SS), etc. that are scrambled with a PCI. Unlike other signals, the positions of REs carrying the CRS may vary with a PCI and thus the positions should be adjusted in an RB carrying the CRS.

Figure 10:
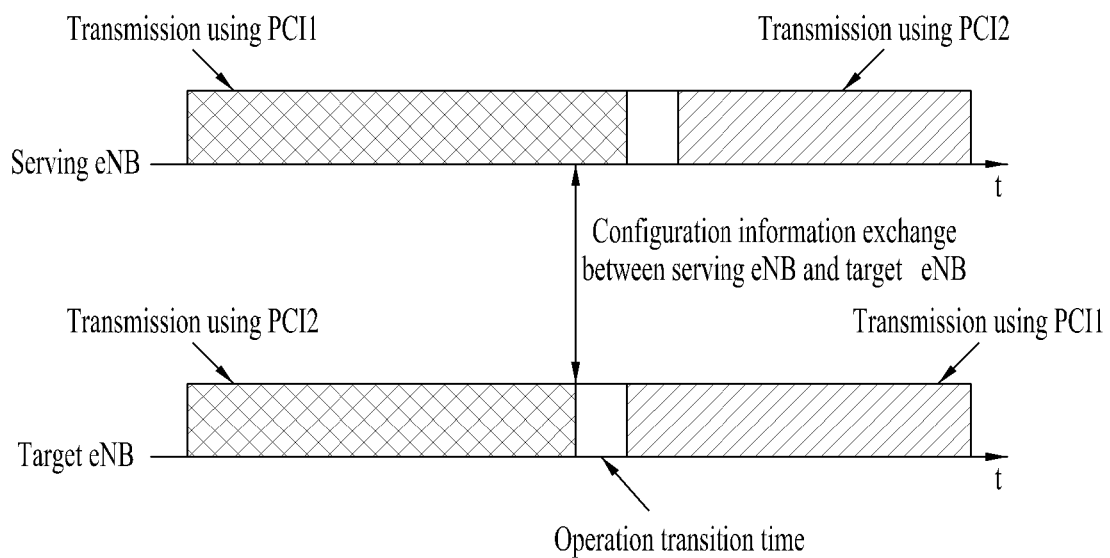
FIG. 10 is a diagram illustrating an operation switching timing related to handover according to an embodiment of the present invention.

FIG. 10 illustrates an example in which a serving cell maintains a transmission operation based on its old configuration information (e.g., PCI1, etc.), taking into account an operation transition time during operation switching between cells. When a target cell switches from a transmission operation based on its old configuration information (e.g., PCI2, etc.) to a transmission operation based on the old configuration information (e.g., PCI1, etc.) of the serving cell, the serving cell may maintain its old transmission operation during the operation transition time, to thereby prevent connection loss between the cell and the UE.

Figure 11:
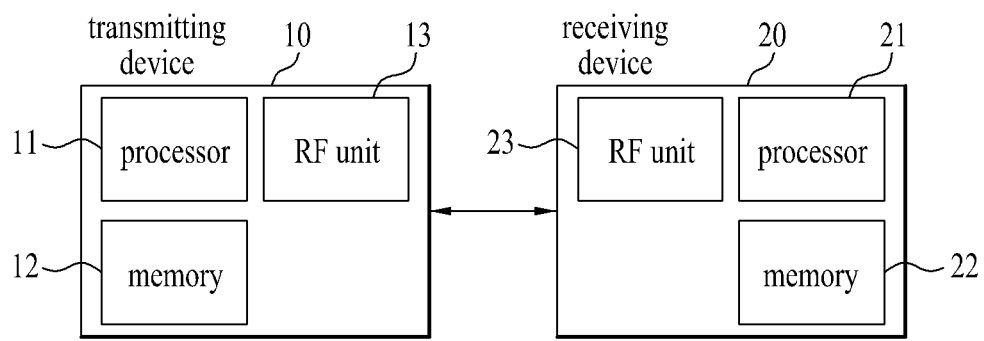
FIG. 11 is a block diagram of apparatuses for implementing an embodiment(s) of the present invention.

FIG. 11 is a block diagram of a transmitting device 10 and a receiving device 20 configured to implement exemplary embodiments of the present invention. Referring to FIG. 11, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

While the embodiments of the present invention have been described focusing on a receiving device operating on an uplink, the embodiments may be applied to a receiving device operating on a downlink The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention can be used for wireless communication systems such as a UE, a relay, an eNB, etc.

The invention claimed is:

1. A method for controlling handover between a first pico Base Station (BS) and a second pico BS in a wireless communication system, performed by the first pico BS, the method comprising:
  receiving, by the first pico BS from the second pico BS, an operation switching request to switch an operation with the second pico BS, instead of a handover request to initiate a handover procedure for a user equipment (UE) with the second pico BS;
  exchanging, by the first pico BS, transmission configuration information with the second pico BS, for switching the operation with the second pico BS,
  wherein exchanging the transmission configuration information with the second pico BS includes transmitting transmission configuration information of the first pico BS and receiving transmission configuration information of the second pico BS,
  wherein the transmission configuration information of the first pico BS includes a first physical cell identity of the first pico BS,
  wherein the transmission configuration information of the second pico BS includes a second physical cell identity of the second pico BS;
  changing, by the first pico BS, the transmission configuration information of the first pico BS to the transmission configuration information of the second pico BS to operate using the transmission configuration information of the second pico BS,
  wherein an operation based on the transmission configuration information of the first pico BS is maintained by the first pico BS, during an operation transition time configured for the change of the transmission configuration information of the first pico BS to the transmission configuration information of the second pico BS; and generating and transmitting, by the first pico BS, a downlink reference signal (RS) of the first pico BS, wherein the downlink RS of the first pico BS is generated and transmitted based on the first physical cell identity before the change of the transmission configuration information of the first pico BS to the transmission configuration information of the second pico BS is completed, and wherein the downlink RS of the first pico BS is generated and transmitted based on the second physical cell identity after the change of the transmission configuration information of the first pico BS to the transmission configuration information of the second pico BS is completed.

2. The method according to claim 1, further comprising requesting information on a downlink RS of the second pico BS to the second pico BS and receiving the information on the downlink RS of the second pico BS from the second pico BS in response to the requesting.

3. The method according to claim 2, wherein the information on the downlink RS of the second pico BS includes a cell identity of the second pico BS.

4. The method according to claim 2, wherein the information on the downlink RS of the second pico BS includes Channel State Information Reference Signal (CSI-RS) configuration information of the second pico BS.

5. The method according to claim 1, further comprising, after the transmission configuration information of the first pico BS is changed to the transmission configuration information of the second pico BS, receiving configuration information on an uplink RS of the UE from the second pico BS and receiving the uplink RS from the UE based on the configuration information on the uplink RS of the UE.

6. A first pico Base Station (BS) for controlling handover between the first pico BS and a second pico BS in a wireless communication system, the first pico BS comprising:

a transceiver; and a processor that:

controls the transceiver to receive, from the second pico BS, an operation switching request to switch an operation with the second pico BS, instead of a handover request to initiate a handover procedure for a user equipment (UE) with the second pico BS, controls the transceiver to exchange transmission configuration information with the second pico BS, for switching the operation with the second pico BS, wherein controlling the transceiver to exchange the transmission configuration information with the second pico BS includes controlling the transceiver to transmit transmission configuration information of the first pico BS and receive transmission configuration information of the second pico BS, wherein the transmission configuration information of the first pico BS includes a first physical cell identity of the first pico BS, wherein the transmission configuration information of the second pico BS includes a second physical cell identity of the second pico BS, changes the transmission configuration information of the first pico BS to the transmission configuration information of the second pico BS to operate using the transmission configuration information of the second pico BS, wherein an operation based on the transmission configuration information of the first pico BS is maintained by the first pico BS, during an operation transition time configured for the change of the transmission configuration information of the first pico BS to the transmission configuration information of the second pico BS, and generates and controls the transceiver to transmit a downlink reference signal (RS) of the first pico BS, wherein the processor is configured to generate the downlink RS of the first pico BS based on the first physical cell identity before the change of the transmission configuration information of the first pico BS to the transmission configuration information of the second pico BS is completed, and wherein the processor is configured to generate the downlink RS of the first pico BS based on the second physical cell identity after the change of the transmission configuration information of the first pico BS to the transmission configuration information of the second pico BS is completed.

* * * * *